G. HONOLD & H. CONZELMANN.
ELECTRICAL REGULATING DEVICE.
APPLICATION FILED SEPT. 24, 1914.

1,238,145.

Patented Aug. 28, 1917.
2 SHEETS—SHEET 1.

WITNESSES

INVENTOR
Gottlob Honold
& Heinrich Conzelmann

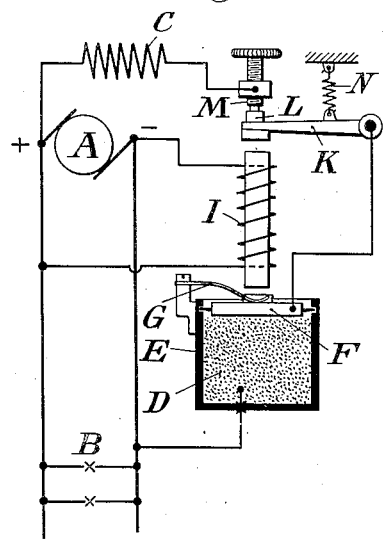
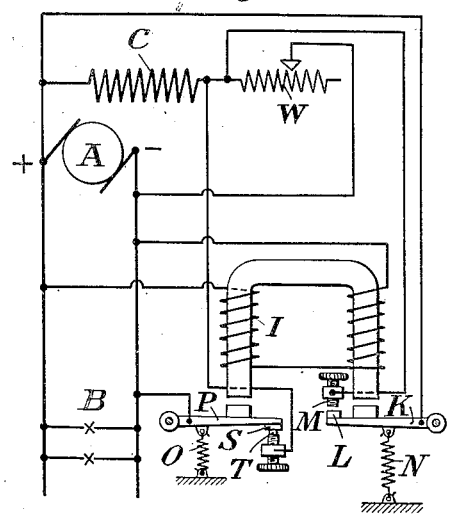

UNITED STATES PATENT OFFICE.

GOTTLOB HONOLD AND HEINRICH CONZELMANN, OF STUTTGART, GERMANY, ASSIGNORS TO THE FIRM OF ROBERT BOSCH, OF STUTTGART, GERMANY.

ELECTRICAL REGULATING DEVICE.

1,238,145.        Specification of Letters Patent.      Patented Aug. 28, 1917.

Application filed September 24, 1914. Serial No. 863,281.

*To all whom it may concern:*

Be it known that we, GOTTLOB HONOLD and HEINRICH CONZELMANN, both subjects of the Emperor of Germany, residing at Stuttgart, Germany, have invented certain new and useful Improvements in Electrical Regulating Devices; and we do hereby declare the following to be a full, clear, and exact description of the invention, such as will enable others skilled in the art to which it appertains to make and use the same.

Under certain conditions, automatic regulators for dynamo electric machines often become ineffective to perform their normal regulating functions, and the dynamo or the power system connected thereto may then be subjected to abnormal electrical strains. For instance, the carbon granules of an electromagnetic regulator may cake together or stratify unequally, when, in consequence of the sudden removal of the load from the dynamo, the voltage rises abruptly and the pressure of the armature of the regulator on the granules is suddenly decreased, or when the regulator is subjected to the jolting and vibration occurring in its application to the lighting of automobiles, motor boats, or the like. So, also, conducting bridges may be formed in the mass by the caking of the granules when the electric current has a comparatively large value. This latter condition may also arise in the case of a resistance made up of a pile of carbon plates, or with vibratory contacts which periodically cut out and cut in a resistance connected in the field circuit of the dynamo, when, for instance, the plates or the contacts fuse as a result of the passage of sparks therebetween. Such occurrences render the regulator ineffective to gradually vary the resistance of the granular mass in substantial coincidence with the pressure of the armature of the regulator and thus the regulator fails.

Furthermore, it may be impossible to obtain the sensitiveness required in regulators of this kind even though the granular mass is properly proportioned and arranged. For instance, if the regulator is adjusted to work properly under normal conditions, that is, under the normal range of pressure of the armature of the regulator, it is not always possible to provide for the occasional severe variations in voltage arising from external causes. In such cases, the exciting current of the dynamo is not decreased when the voltage to be regulated continues to increase, even though the voltage finally attains an excessive value.

The invention disclosed herein is intended to provide an arrangement wherein the foregoing defects are eliminated. It embodies the use of supplementary electrical contacts so arranged in the power system that when the excitation of the electromagnetic regulator exceeds a predetermined value, the field excitation of the dynamo is suddenly reduced to an abnormally low value, that is, to a value insufficient for the dynamo to maintain a predetermined characteristic, such for instance, as a constant voltage, or a constant current; but when the excitation of the electromagnetic regulator is less than this predetermined value, the regulator is effective to regulate the dynamo to the predetermined characteristic. In the specific embodiments shown herein, one of the supplementary electrical contacts is carried by an armature of the regulator, while the coöperative contact is stationary, and the two contacts are so electrically connected to the power system that when the predetermined excessive excitation of the regulator is reached the electrical contacts move relatively to each other to open the exciting circuit of the dynamo, or to short circuit the field winding of the dynamo, or to insert a resistance in the field circuit. In this way, the excitation of the dynamo is decreased to the abnormally low value before the voltage of the dynamo can increase to such a value as may burn out the circuits or the lamps in the power system.

In the accompanying drawings, diagrammatically illustrating the application of our invention to electric power systems, Figure 1 shows supplementary contact terminals arranged to short circuit the dynamo field;

Fig. 5 shows an arrangement wherein the supplementary contacts are normally in engagement with each other, but are separated upon excessive excitation of the regulator to interrupt the field circuit of the dynamo; and Fig. 6 shows a regulator of the vibratory type wherein the supplementary contacts are arranged to short circuit the field winding of the dynamo.

In all of the figures, A indicates the armature of the dynamo electric machine, B the external electrical circuit containing the translating devices, such as incandescent lamps, and C the field winding of the dynamo.

Figure 1:
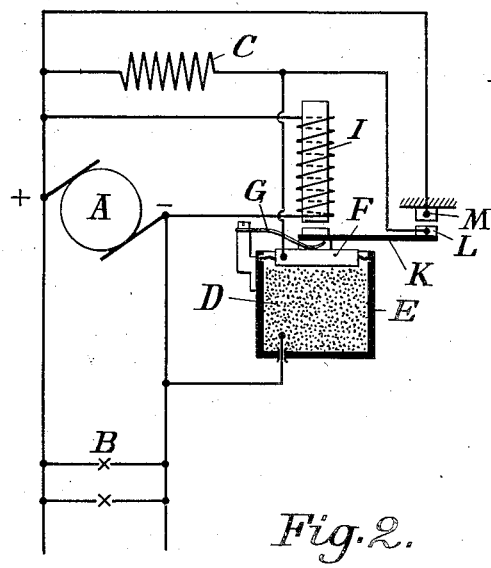

In Fig. 1, the field winding of the dynamo is electrically connected in series with the resistance mass D of granular carbon. The housing E for this mass is covered by the armature F of an electromagnet I, and this armature is normally pressed by the spring G upon the granular mass. The current flows from the positive terminal of the dynamo through the field winding C, and thence through the pressure armature F and the granular mass D to the negative terminal of the dynamo. The exciting winding of the electromagnet I is connected in shunt relation to the dynamo so as to be responsive to the voltage thereof. A bar K is fastened to the armature of the electromagnet regulator in such way that the supplementary contact terminal L carried thereby co-acts with the stationary coöperative contact terminal M. These two contact terminals are connected across the field winding C, so that when in engagement the field winding is short circuited.

The operation of the electromagnetic regulator is apparent. If, however, the mass D becomes inoperative in that the granules become caked together, or adhere to the pressure armature F, or as a result of unequal stratification in the mass, an increase of the resistance of the mass does not take place properly when the pressure of the pressure armature is suddenly reduced, or if the granular mass forms a substantial short circuit, the excitation of the electromagnet I will increase as the voltage rises until at a predetermined excessive excitation the pressure armature K will be drawn up to that point at which the supplementary contact terminals L, M, are engaged. As soon as this occurs, the field winding C becomes short circuited, and the voltage of the dynamo thereupon decreases to an abnormally low value, that is, to a value insufficient for the dynamo to maintain a predetermined characteristic. The pressure armature F will then be drawn down by the spring G, the contacts L, M separated, and the electromagnetic regulator will again endeavor to regulate the dynamo to the predetermined characteristic.

Figure 2:
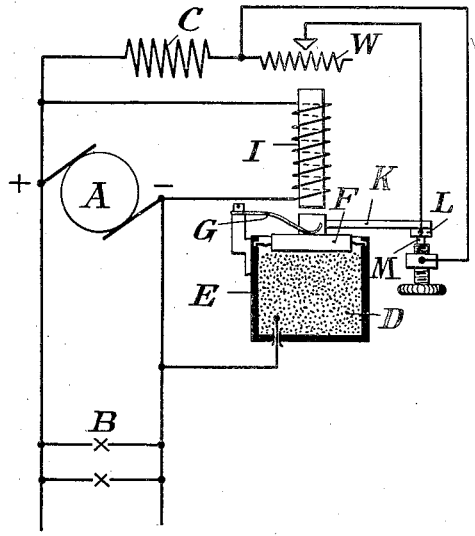
Fig. 2 shows the arrangement wherein a supplementary resistance is connected in series with the dynamo field when the electrical contacts are disengaged.

Fig. 2 shows coöperating contact terminals L, M, arranged to be normally in engagement, the circuit of the field winding C being normally completed through them, and thence through the resistance mass of the electromagnetic regulator. However, when the excitation of the electromagnet I reaches the predetermined excessive value, these contact terminals are separated and the adjustable resistance W becomes connected in series with the field coil C, to thereby reduce the field excitation of the dynamo to an abnormally low value, that is, to a value insufficient for the dynamo to maintain a predetermined characteristic.

Figure 3:
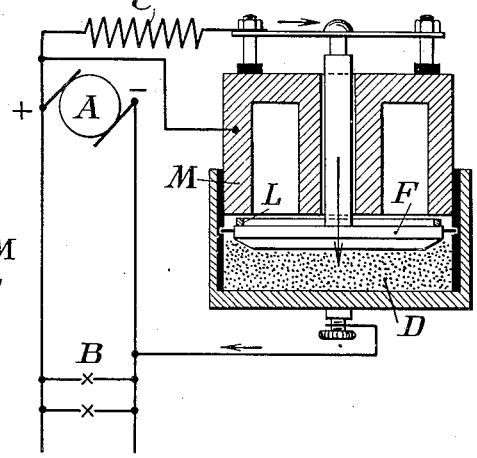
Fig. 3 is similar to the arrangement of Fig. 1, excepting that one of the electrical contacts is carried on the pressure armature of the regulator, while the other electrical contact is formed by a fixed metal part of the regulator.

In the modification shown in Fig. 3, the stationary contact terminal is formed by a metal part of the electromagnetic regulator as indicated by M, while the movable coöperative contact terminal, as indicated by L, is in the form of a ring and is made of a non-magnetic metal, such as lead, carried by the pressure armature F. In this case, the field winding C of the dynamo is short circuited through the supplementary contacts L, M, when the excitation of the electromagnetic regulator reaches the predetermined excessive value.

Figure 4:
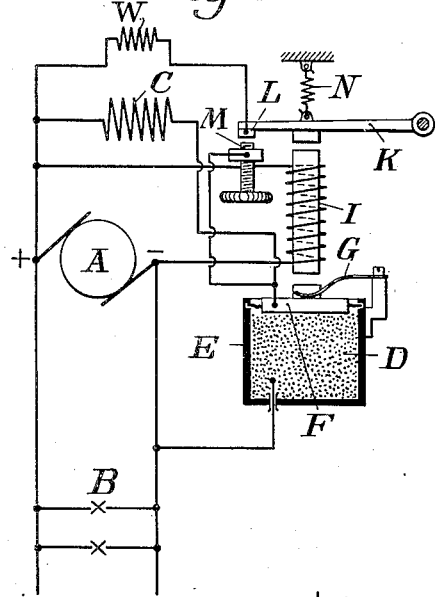
Fig. 4 shows an arrangement wherein a supplementary resistance is connected in electrical parallel with the field winding of the dynamo by engagement of the supplementary contact terminals.

Fig. 4 shows an arrangement similar to Fig. 1, excepting that the outer pole of the electromagnet I acts upon an armature K to bring the contact terminal L into engagement with the coöperative terminal M when the excitation of the electromagnet reaches the predetermined excessive value. The attraction of the electromagnet I for the armature K is resisted by the spring N. Upon engagement of the coöperative terminals L, M, the supplementary resistance W is connected in electrical parallel with the field winding C of the dynamo, to thereby reduce the field excitation of the dynamo to an abnormally low value, that is to a value insufficient for the dynamo to maintain its predetermined characteristic.

In the arrangement shown in Fig. 5, the coöperative contact terminals L, M are connected directly in the circuit of the field winding C of the dynamo. Thus, when the armature K is drawn down by the electromagnet I against the stress of the spring N, the field circuit of the dynamo is interrupted.

Fig. 6 shows an arrangement wherein an electromagnetic regulator of the vibratory type is used instead of the pressure type hereinbefore described. In this case, the resistance W is continually cut into and cut out of the circuit of the field winding C of the dynamo by the vibratory contacts S, T, to regulate the dynamo to a predetermined characteristic in the well known way. The spring O resists the attraction of the electromagnet I on the armature P which carries the terminal S. The other pole of the U-shaped electromagnet I attracts the armature K against the stress of the spring N, and at a predetermined excitation of the electromagnet, the supplementary contact terminal L is brought into engagement with the coöperative terminal M. The electrical connections are such that the field winding C of the dynamo is then short circuited through these supplementary contacts to thereby reduce the field excitation of the dynamo to an abnormally low value, that is, to a value insufficient for the dynamo to maintain its predetermined characteristic. If, for any reason, the vibratory contacts S, T should be fused together or remain in contact for any other reason, the supplementary contacts L, M, will be brought into engagement when the predetermined excitation is reached, and in this way, the system will be protected from excessive voltage.

It will be understood that the winding of the electromagnetic regulator may be connected in series with the external circuit, so as to regulate the dynamo to a constant current, as shown for example in Fig. 2 of British Patent 27961 of 1912; or various other forms of connection may be used so as to regulate the dynamo to other desired characteristics.

Having thus described our invention, what we claim is:

1. In an electric power system, a dynamo having a field winding, an electromagnetic regulator embodying a resistance and an armature designed to vary said resistance, said regulator being electrically connected to the system so as to normally vary the field excitation of the dynamo in such manner as to regulate the dynamo to a predetermined characteristic, and coöperative electrical contacts and circuit connections controlled by the regulator and operative upon a predetermined excessive excitation thereof to suddenly decrease the field excitation of the dynamo to an abnormally low value; substantially as described.

2. In an electric power system, a dynamo having a field winding, an electromagnetic regulator embodying a mass of granular resistance material and an armature designed to vary the resistance of the mass in substantial coincidence with the pressure thereon, said regulator being electrically connected to the system so as to normally vary the field excitation of the dynamo in such manner as to regulate the dynamo to a predetermined characteristic, contacts movable relatively to each other by the regulator, and circuit connections coöperating with the contacts to suddenly decrease the field excitation of the dynamo to an abnormally low value upon relative movement of the contacts due to a predetermined excessive excitation of the regulator.

3. In an electric power system, a dynamo having a field winding, an electromagnetic regulator embodying resistance material and an armature designed to vary the resistance thereof by pressure, said regulator being electrically connected to the system so as to normally vary the field excitation of the dynamo in such manner as to regulate the dynamo to a predetermined characteristic, a contact terminal of non-magnetic material carried by the armature, and adapted to engage a fixed metallic part of the regulator, and circuit connections coöperating with said terminal and said fixed part to suddenly decrease the field excitation of the dynamo to an abnormally low value upon engagement of said terminal with said fixed metallic part due to a predetermined excessive excitation of the regulator.

4. In an electric power system, a dynamo having a field winding, an electromagnetic regulator embodying resistance material, an armature designed to vary the resistance thereof by pressure, said regulator being electrically connected to the system so as to normally vary the field excitation of the dynamo in such manner as to regulate the dynamo to a predetermined characteristic, a contact terminal of non-magnetic material carried by the armature, and adapted to engage a fixed metallic part of the regulator, and circuit connections coöperating with said terminal and said fixed part to short circuit the field winding of the dynamo upon engagement of said terminal with said fixed part due to a predetermined excessive excitation of the regulator.

In testimony whereof we affix our signatures in presence of witnesses.

GOTTLOB HONOLD.
HEINRICH CONZELMANN.

Witnesses:
ADOLF LEBHERZ,
FREDK. KLAUBER,
PAULINE MÜLLER.